United States Patent
Bantz et al.

(10) Patent No.: US 12,107,463 B2
(45) Date of Patent: Oct. 1, 2024

(54) GROUNDING RING AND ARRANGEMENT COMPRISING SUCH A GROUNDING RING

(71) Applicant: Carl Freudenberg KG, Weinheim (DE)

(72) Inventors: Marlene Bantz, Edesheim (DE); Francois Colineau, Schallstadt-Leutersberg (DE); Frank Guder, Frankenthal (DE); Guenter Hintenlang, Abtsteinach (DE); Soeren Neuberger, Hockenheim (DE); Gerhard Kutschera, Heppenheim (DE); Jens Hofmann, Mannheim (DE)

(73) Assignee: CARL FREUDENBERG KG, Weinheim (DE)

( * ) Notice: Subject to any disclaimer, the term of this patent is extended or adjusted under 35 U.S.C. 154(b) by 358 days.

(21) Appl. No.: 17/590,830

(22) Filed: Feb. 2, 2022

(65) Prior Publication Data

US 2022/0247284 A1   Aug. 4, 2022

(30) Foreign Application Priority Data

Feb. 4, 2021   (DE) .................... 10 2021 102 570.2

(51) Int. Cl.
*H02K 11/40* (2016.01)
*H02K 5/22* (2006.01)
*H02K 7/00* (2006.01)

(52) U.S. Cl.
CPC ............ *H02K 11/40* (2016.01); *H02K 5/225* (2013.01); *H02K 7/003* (2013.01)

(58) Field of Classification Search
CPC ............................. H02K 11/40; H02K 5/225
See application file for complete search history.

(56) References Cited

U.S. PATENT DOCUMENTS

| | | | |
|---|---|---|---|
| 8,747,126 B2 * | 6/2014 | Corbett | H01R 4/66 439/98 |
| 10,161,522 B2 | 12/2018 | Colineau et al. | |
| 10,190,690 B2 | 1/2019 | Colineau et al. | |
| 10,840,778 B2 * | 11/2020 | van Bezooijen | H02K 7/003 |
| 11,070,114 B2 | 7/2021 | Lenz et al. | |
| 11,081,942 B2 * | 8/2021 | Schroth | H02K 5/1735 |
| 11,131,386 B2 * | 9/2021 | Dahlhaus-Preussler | F16J 15/3232 |

(Continued)

FOREIGN PATENT DOCUMENTS

| | | |
|---|---|---|
| CN | 105305357 A | 2/2016 |
| DE | 102013000982 A1 | 7/2014 |

(Continued)

*Primary Examiner* — Robert W Horn
(74) *Attorney, Agent, or Firm* — LEYDIG, VOIT & MAYER, LTD.

(57) ABSTRACT

A grounding ring, including a substantially circular-ring-shaped hub and at least two sliding contacts, which are arranged on the outside of the hub in the radial direction, extend in the circumferential direction and, in the manufactured state of the grounding ring, are arranged adjacent to one another at a distance from one another in the circumferential direction and delimit a circumferential gap with their sides facing one another in the circumferential direction, and wherein the circumferential gap is substantially bridged during the intended use of the grounding ring by the mutually facing and mutually non-overlapping sides.

14 Claims, 5 Drawing Sheets

(56) References Cited

U.S. PATENT DOCUMENTS

| | | | |
|---|---|---|---|
| 11,421,739 B2* | 8/2022 | Hubert | F16C 33/586 |
| 11,936,254 B2* | 3/2024 | Hubert | H02K 7/08 |
| 2014/0041938 A1* | 2/2014 | Corbett | H01R 4/5025 |
| | | | 174/75 R |
| 2016/0050781 A1* | 2/2016 | Kellogg | H05K 5/0247 |
| | | | 174/51 |
| 2019/0109520 A1* | 4/2019 | van Bezooijen | H02K 7/003 |
| 2019/0276119 A1 | 9/2019 | Colineau et al. | |
| 2022/0247284 A1* | 8/2022 | Bantz | F16J 15/3204 |
| 2022/0311315 A1* | 9/2022 | Lindener | H02K 7/003 |

FOREIGN PATENT DOCUMENTS

| | | |
|---|---|---|
| DE | 102014010269 A1 | 1/2016 |
| DE | 102017009360 A1 | 4/2019 |
| DE | 102018105376 A1 | 9/2019 |
| DE | 102018208823 A1 | 12/2019 |
| JP | 07253165 A | 10/1995 |
| WO | 2017148586 A1 | 9/2017 |

* cited by examiner

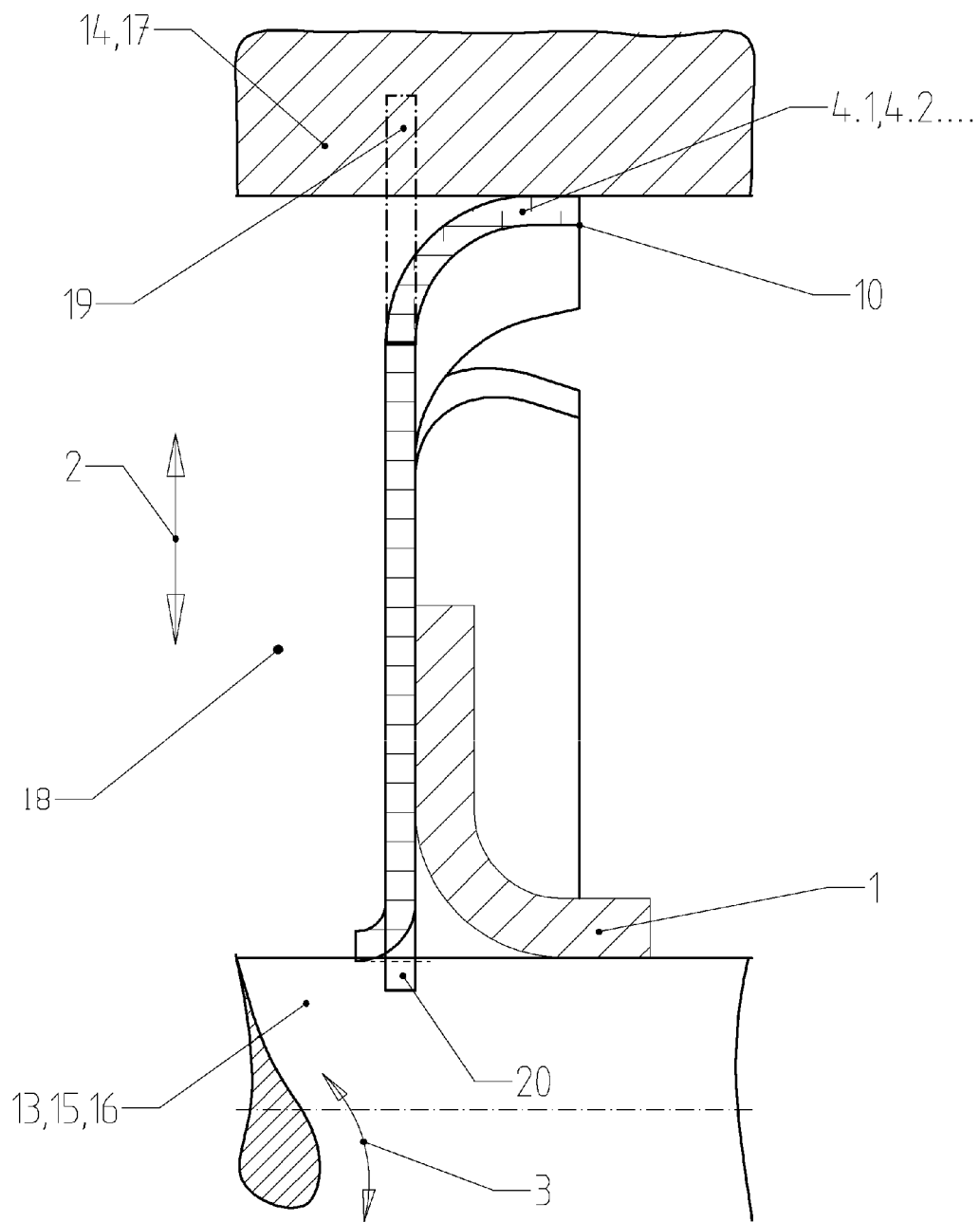

GROUNDING RING AND ARRANGEMENT COMPRISING SUCH A GROUNDING RING

CROSS-REFERENCE TO PRIOR APPLICATIONS

This application claims benefit to German Patent Application No. DE 10 2021 102 570.2, filed on Feb. 4, 2021, which is hereby incorporated by reference herein.

FIELD

The invention relates to a grounding ring and an arrangement comprising such a grounding ring.

BACKGROUND

A grounding ring and an arrangement comprising such a grounding ring are known from DE 10 2018 105 376 A1.

The grounding ring is designed as a ballast seal for a sealing ring and consists of an electrically conductive material that, during its intended use, is in bearing contact with the surface of a first machine element to be grounded. A second machine element, which, like the first machine element, consists of an electrically conductive material and is arranged concentrically to the first machine element, is grounded to a defined ground potential, wherein the first and second machine elements are electrically conductively connected by the grounding ring.

DE 10 2013 000 982 A1 discloses a seal that comprises a sealing ring with at least one dynamically stressed sealing lip and a ballast seal designed as a grounding ring. The ballast seal is arranged at an axial distance adjacent to the sealing lip and consists of an electrically conductive material. The sealing lip and the ballast seal enclose with sealing effect a surface to be sealed of a first machine element to be sealed, wherein the first machine element is arranged at a radial distance adjacent to a second machine element. The sealing ring and the ballast seal are arranged in the gap formed by the radial distance. The second machine element is grounded to a defined ground potential, wherein the first and second machine elements are each in bearing contact with the ballast seal and are thus electrically conductively connected to one another.

The ballast seal is designed as a potential equalization ring and consists, for example, of an electrically conductive non-woven fabric impregnated with PTFE. Mechanical damage to the machine elements by an electrical voltage breakdown is consequently ruled out.

Without the electrical potential equalization, mechanical damage to the machine elements to be sealed off from one another could result from different electrical potentials of the machine elements being equalized by an electrical voltage breakdown. Such a voltage breakdown is more likely the closer the machine elements with different electrical potentials are assigned to one another. A voltage breakdown can cause a material removal at the machine element with a relatively lower charge and a change in the material structure in the region in which the voltage breakdown takes place.

DE 10 2014 010 269 A1 discloses a further ballast seal.

The ballast seal comprises a substantially circular-ring-shaped disk made of an electrically conductive and air-permeable material and a supporting body, wherein the disk is designed as a separately produced individual part—in relation to the supporting body—and connected to the supporting body.

The supporting body can be formed by a sealing ring.

The ballast seal not only has the task of electrical potential equalization, but also the task of preventing impurities from the environment from penetrating as far as the sealing lip of the sealing ring.

The ballast seal is a decoupled electrical bridge. In this context, "decoupled" is understood to mean that the sealing function of a sealing ring, which is combined with the ballast seal, for example, is decoupled from the function of the electrical bridge, namely to avoid a voltage breakdown and to cause an electrical potential equalization between the machine elements.

WO 2017/148586 A1 discloses a shaft grounding ring that is used to discharge induced voltages or electrical charges from a first machine element, preferably a shaft, into a second machine element. The shaft grounding ring has an annular housing that consists of electrically conductive material, is electrically conductively connected to one machine element and is electrically conductively connected to at least one discharge element. The discharge element also consists of an electrically conductive material and is electrically conductively connected to the other machine element. The discharge element is a disk-shaped discharge body extending at least over part of its circumference.

SUMMARY

In an embodiment, the present invention provides a grounding ring, comprising a substantially circular-ring-shaped hub and at least two sliding contacts, wherein: the at least two sliding contacts are arranged on an outside of the hub in a radial direction, extend in a circumferential direction, in a manufactured state of the grounding ring, are arranged adjacent to one another at a distance from one another in the circumferential direction and delimit a circumferential gap, each of the sliding contacts comprises sides facing one another in the circumferential direction, and the circumferential gap is substantially bridged by the mutually facing and mutually non-overlapping sides.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1b shows an exemplary arrangement with the grounding ring from FIG. 1a;

FIG. 2b shows an exemplary arrangement with the grounding ring from FIG. 2a; and FIG. 3 shows a third exemplary embodiment of the grounding ring, which is of two-part design and bears electrically conductively against the first machine element

DETAILED DESCRIPTION

Figure 1A:
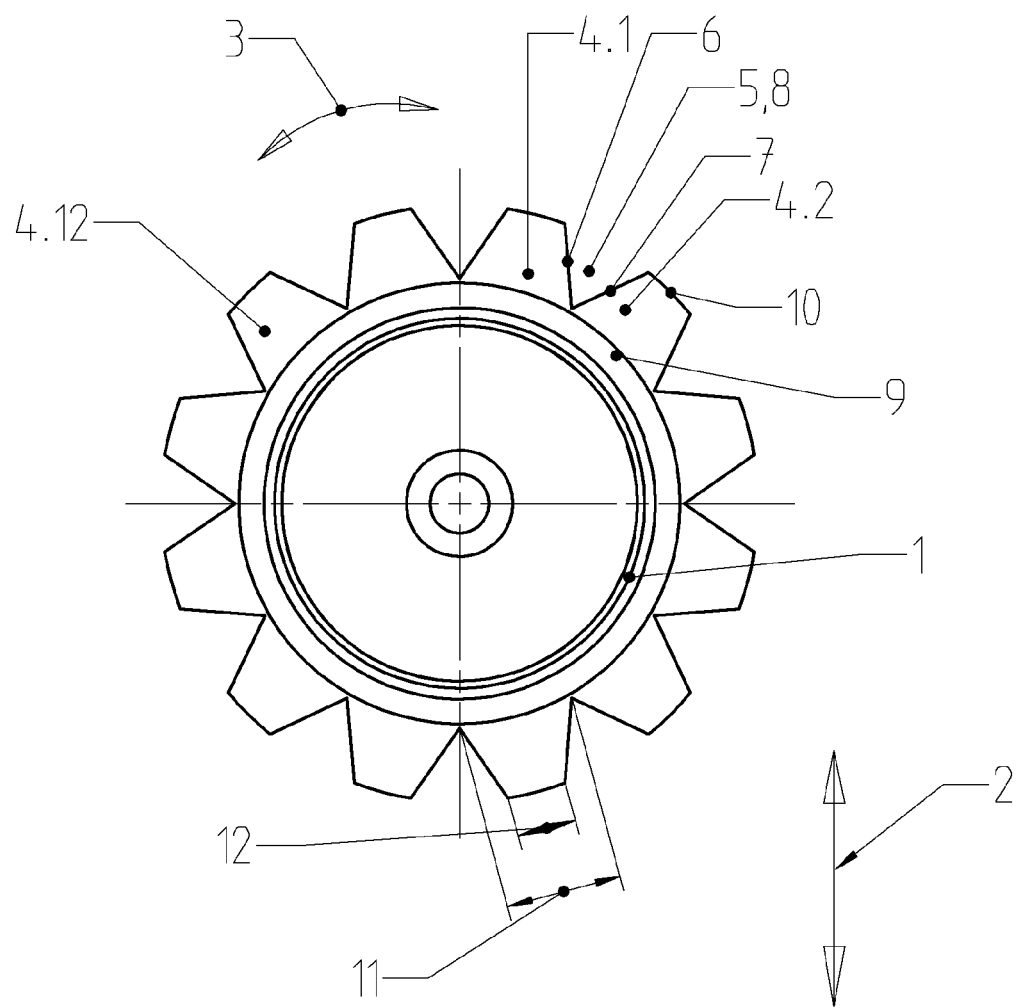
FIG. 1a shows a first exemplary embodiment of the grounding ring in a side view from the right and in its manufactured state.

The invention is based on the object of further developing a grounding ring in such a way that substantially the entire circumference of the machine element in bearing contact with the sliding contacts is used for contacting by means of the sliding contacts, and thus different electrical potentials of the machine elements electrically conductively connected by the grounding ring are equalized. Voltage breakdowns between the machine elements are to be effectively prevented. In addition, it is to be possible to produce the grounding ring in a cost-effective and process-reliable manner in terms of manufacturing technology. This object is achieved according to the invention by a grounding ring according to the claims. Other disclosures herein relate to advantageous embodiments of the grounding ring and arrangements thereof.

In order to achieve the object, a grounding ring is provided, comprising a substantially circular-ring-shaped hub and at least two sliding contacts that are arranged on the outside of the hub in the radial direction, extend in the circumferential direction and, in the manufactured state of the grounding ring, are arranged adjacent to one another at a distance from one another in the circumferential direction and delimit a circumferential gap with their sides facing one another in the circumferential direction, wherein the circumferential gap is substantially bridged during the intended use of the grounding ring by the mutually facing and mutually non-overlapping sides.

The sliding contacts of the grounding ring according to the invention are provided for external contacting, in the radial direction. In principle, the grounding ring according to the invention is used during its intended use in an arrangement with a first and a second machine element, wherein the grounding ring and the two machine elements each consist of an electrically conductive material. The first machine element, which is formed, for example, by a shaft or an axle, is enclosed on the outer circumferential side at a radial distance by the second machine element, which is formed by a housing enclosing the shaft or axle at a radial distance, wherein the externally contacting grounding ring is arranged in the gap formed by the distance. The two machine elements are electrically conductively connected to one another by the grounding ring. During the intended use, the grounding ring thus ensures an electrical potential equalization between the machine elements and thus prevents an electrical voltage breakdown.

In the manufactured state, the grounding ring substantially has the shape of a circular ring-shaped disk, which comprises the circular ring-shaped hub on the inside in the radial direction and the sliding contacts arranged adjacent to one another in the circumferential direction with the circumferential gap on the outside in the radial direction.

During the intended use, that is to say in the installed state of the grounding ring, a coverage between the machine element against which the sliding contacts bear and the sliding contacts is necessary in order to ensure electrically conductive contact at all times, including when the machine element and the sliding contacts are not arranged exactly concentrically to one another and/or the machine element and/or the sliding contacts have an imbalance during the intended use.

Due to this necessary coverage, the sliding contacts must be displaced from their manufactured state to a smaller diameter for the intended use, and therefore slots between the individual sliding contacts are unavoidable. Without slots, the outer circumference would be compressed into the arrangement during the installation of the grounding ring and wrinkle in the circumferential direction.

However, depending on the shaping of the slots, the unavoidable slots mean that normally it is no longer possible for the entire circumference of the adjacent machine element to be in bearing contact with the sliding contacts.

If a part of the inner circumference of the machine element is not in bearing contact with the sliding contacts, the effectiveness of the electrical potential equalization is impaired, and therefore, despite a grounding ring in the arrangement, an undesired electrical voltage breakdown between the machine elements can occur.

In order to prevent this, it is provided in the grounding ring according to the invention that the circumferential gap is substantially bridged during the intended use of the grounding ring by the mutually facing and non-overlapping sides. Such a grounding ring contacting on the outside in the radial direction has the advantage that practically the entire inner circumference of the machine element radially adjacent to the sliding contacts on the outer circumferential side is in bearing contact with the sliding contacts. Due to the practically complete contact of the inner circumference of the machine element radially adjacent to the sliding contacts, the best possible electrical potential equalization and the greatest safety against electrical voltage breakdown and damage to the machine elements are provided.

An overlapping of sliding contacts arranged adjacent to one another in the circumferential direction during the intended use would also be disadvantageous, because the overlapping sides of mutually adjacent sliding contacts prevent contact of the adjacent machine element around the full circumference.

According to an embodiment, it can be provided that the number of sliding contacts is 4 to 50.

In some embodiments, the number of sliding contacts is 8 to 12.

Such numbers of sliding contacts achieve a good compromise between the possibility of producing the grounding ring cost-effectively and good adaptability of the sliding contacts to the internal diameter of the machine element enclosing the sliding contacts on the outer circumferential side. The circumferential gaps are substantially bridged by the mutually facing sides of mutually adjacent sliding contacts, without the sides disadvantageously overlapping one another in the circumferential direction of adjacent sliding contacts.

The circumferential gap can have a radial extent of 2 mm to 20 mm. A large radial extent of the circumferential gaps is expedient if the first and second machine elements each have large diameters.

According to an embodiment, it can be provided that the circumferential gap in the manufactured state of the grounding ring is delimited in a substantially U-shaped manner. Such circumferential gaps delimited in a U-shaped manner can be produced particularly easily and cost-effectively. However, bridging of the circumferential gap is only possible to a limited extent.

According to a technically improved embodiment, it can be provided that the circumferential gap in the manufactured state of the grounding ring is delimited in a substantially V-shaped manner. Such a V-shaped delimitation of the circumferential gap is advantageous in several respects. In the installed state of the grounding ring, the circumferential gap can be substantially completely bridged without the mutually facing sides of mutually adjacent sliding contacts overlapping one another. This ensures particularly good, practically continuous contacting of the machine element surrounding the sliding contacts on the outer circumferential side.

In addition, it is advantageous that the sliding contacts have a particularly good and strong restoring effect due to the circumferential gap delimited in a V-shaped manner, because the base of the sliding contacts with which they are fixed on the hub is comparatively wide.

The pressing force of the sliding contacts on the inner circumference of the radially adjacent machine element is increased by the wide base. As a result, relaxation during a long service life is also prevented, and the sliding contacts always bear against the adjacent machine element with a constant prestress.

As already stated above, the sliding contacts can have a base on their side facing the hub in the radial direction and a free end on their side opposite in the radial direction, wherein the base has a first width in the circumferential direction, wherein the free end has a second width in the circumferential direction and wherein the first width is greater than the second width.

In some embodiments, the ratio of first width to second width is 1.25 to 1.5. With such a ratio, the circumferential gap can be bridged as far as possible by the mutually facing sides of adjacent sliding contacts, and therefore there is a particularly large contact area between the sliding contacts and the inner circumferential surface of the machine element surrounding the grounding ring. In addition, in the case of such a ratio, the sliding contacts in the installed state have a sufficiently large restoring force during their intended use, so that reliable contacting and thus a reliable electrical potential equalization is provided in all operating states of an arrangement comprising the grounding ring.

The hub and the sliding contacts can merge integrally into one another and be formed from uniform material and consist of an electrically conductive material.

The electrically conductive material can be a metallic material. Electrically conductive metallic materials are largely available at low cost in a wide variety of specifications. In addition, they can be processed easily, cost-effectively and reliably into the grounding ring.

As already stated above, the grounding ring and the two machine elements of the arrangement each consist of an electrically conductive material, wherein the first machine element is enclosed by the second machine element at a radial distance, and wherein the grounding ring is arranged in the gap formed by the distance. The grounding ring is connected in a relatively rotationally fixed and electrically conductive manner to the first machine element and is in bearing contact with the second machine element in an electrically conductive manner, in a relatively rotatable manner and on the inside in the radial direction under elastic prestress, wherein the second machine element surrounds the first machine element on the outer circumferential side. The two machine elements are electrically conductively connected to one another by means of the grounding ring; the grounding ring ensures electrical potential equalization between the two machine elements.

The sliding contacts can be assigned to the second machine element with a radially outer coverage of 1 mm to 6 mm.

The sliding contacts can be assigned to the first machine element with a radially inner coverage of 0.2 mm to 1.2 mm.

The aforementioned coverages ensure a particularly reliable and good potential equalization between the machine elements by the grounding ring.

The bending direction of the sliding contacts in the radial direction on the outside of the second machine element can be designed in both axial directions, depending on the mounting direction of the grounding ring.

The grounding ring is preferably connected to the first machine element in a force-fitting and/or form-fitting manner. A rotationally fixed connection that is simple and cost-effective to produce is thereby produced.

Very generally, there is the possibility that the grounding ring and the first machine element rotate together and that the sliding contacts of the grounding ring are thus supported on the inner circumference of the stationary second machine element. It is also possible for the second machine element to rotate about the first machine element and the grounding ring.

The conductive continuity between the grounding ring and the first machine element to which it is connected in a rotationally fixed manner, can alternatively be provided by the hub of the grounding ring and the first machine element being in direct bearing contact or in indirect contact by means of an electrically conductive adhesive.

Preferably, the first machine element and the grounding ring form a pre-assemblable unit that executes a rotational movement relative to the second machine element.

Three exemplary embodiments of the grounding ring according to the invention are shown schematically in FIGS. 1a, 1b, 2a, 2b and 3 and are described in more detail below.

Figure 1B:
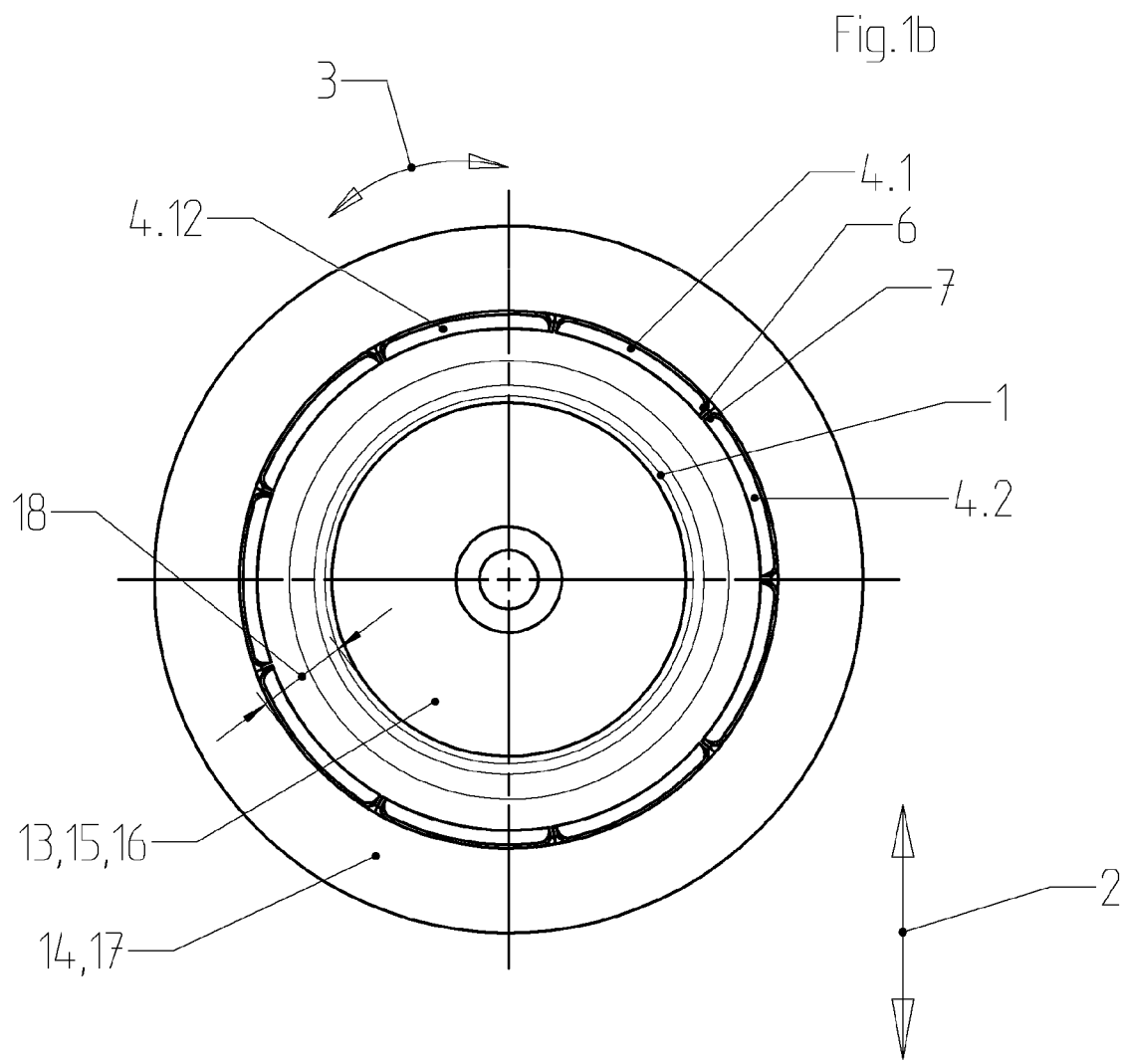

FIGS. 1a and 1b show a first exemplary embodiment of a grounding ring and an arrangement comprising the grounding ring.

FIG. 1a shows the grounding ring in a side view from the right in its manufactured state. The grounding ring comprises the circular ring-shaped hub 1 and nine sliding contacts 4.1, 4.2, . . . , 4.12 arranged on the outside of the hub 1 in the radial direction 2. The sliding contacts 4.1, 4.2, . . . , 4.12 extend in the circumferential direction 3 and are arranged adjacent to one another at a distance 5 from one another in the circumferential direction 3. The sides 6, 7 of adjacent sliding contacts 4.1, 4.2, . . . , 4.12 facing one another in the circumferential direction 3 delimit the circumferential gap 8, which in the exemplary embodiment shown is delimited in a substantially V-shaped manner.

FIG. 1b also shows the grounding ring from FIG. 1a in a view from the right, but during its intended use, installed in an arrangement according to the invention.

The grounding ring is connected in a rotationally fixed manner by means of its hub 1 to the first machine element 13, which is designed as a shaft 15 or axle 16. The grounding ring is enclosed in the radial direction on the outer circumferential side by the second machine element 14, which is formed by a housing 17 in the exemplary embodiment shown. The grounding ring is arranged in the gap 18 between the first machine element 13 and the second machine element 14.

The grounding ring and the two machine elements 13, 14 each consist of an electrically conductive material.

During the installation of the grounding ring into the gap 18, the outer diameter of the sliding contacts 4.1, 4.2, . . . , 4.12 is reduced in order to achieve a coverage necessary for the contact pressure of the sliding contacts 4.1, 4.2, . . . , 4.12 on the inner circumference of the second machine element 14. As a result of the coverage, the sliding contacts 4.1, 4.2, ..., 4.12 are in bearing contact with the inner circumference of the second machine element 14 under radial prestress.

By installing the grounding ring together with the first machine element 13 into the second machine element 14, the circumferential gap 8 between the mutually adjacent sliding contacts 4.1, 4.2, ..., 4.12 closes substantially completely, so that the inner circumference of the second machine element 14 is in bearing contact with the sliding contacts 4.1, 4.2, ..., 4.12 in a practically uninterrupted manner in the circumferential direction. In this way, a particularly effective electrical potential equalization is possible.

As can be seen well in particular in FIG. 1a, the base 9 of the sliding contacts 4.1, 4.2, ..., 4.12 on the side facing the hub 1 in the radial direction 2 is wider than the free end 10 opposite the base 9 in the radial direction 2.

In the exemplary embodiment shown, the ratio of the first width 11 of the base 9 to the second width 12 of the free end 10 is approximately 1.3.

In the embodiment shown, the hub 1 and the sliding contacts 4.1, 4.2, ..., 4.12 merge integrally into one another and are formed from uniform material and consist of an electrically conductive, metallic material.

Figure 2A:
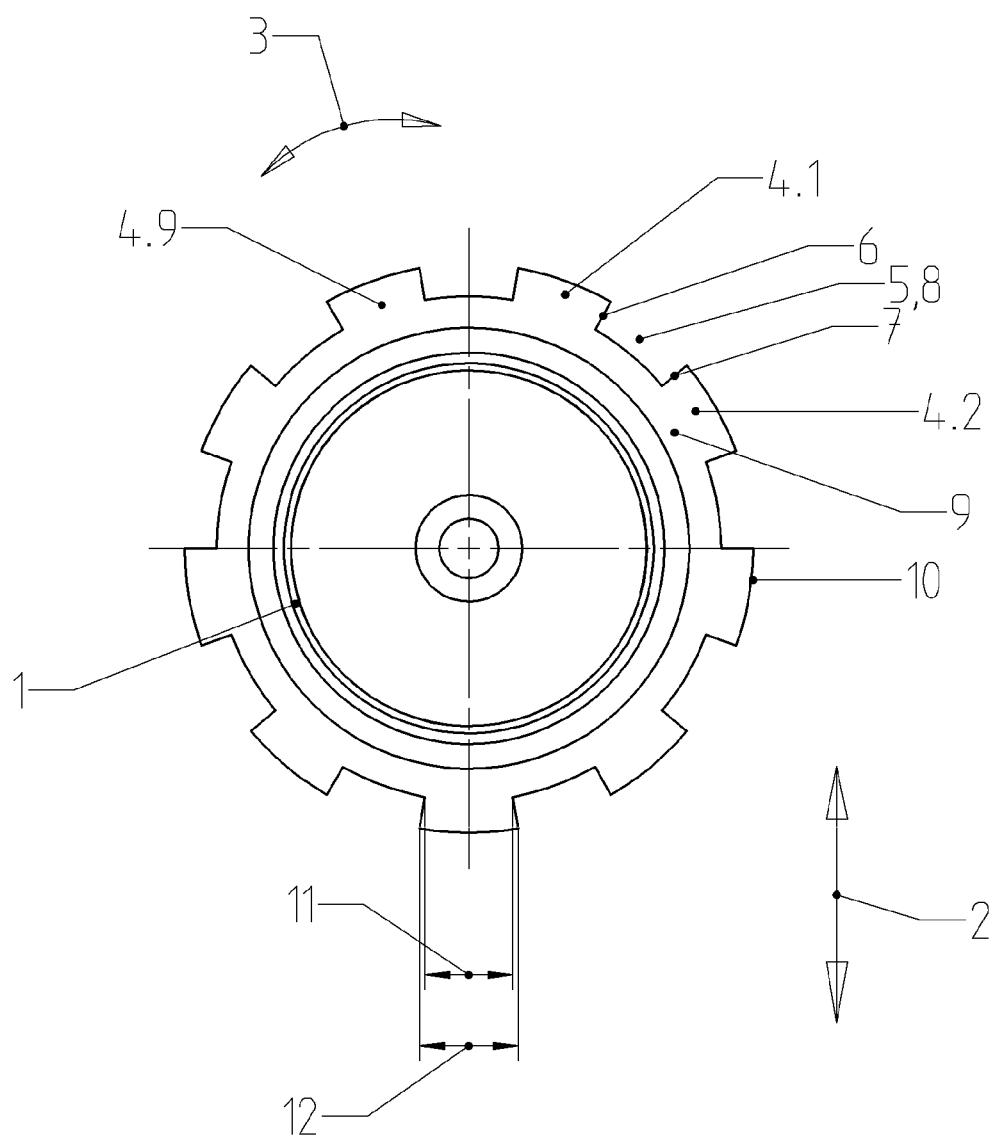
FIG. 2a shows a second exemplary embodiment of the grounding ring, likewise in a side view from the right and in its manufactured state.

FIG. 2a shows an embodiment of a grounding ring with which the circumferential gap 8 between the sliding contacts 4.1, 4.2, ..., 4.9 is U-shaped.

In comparison with the circumferential gap 8 delimited in a V-shaped manner in FIG. 1a, the circumferential gap 8 delimited in a U-shaped manner in FIG. 2a is less advantageous, because the contact area between the sliding contact 4.1, 4.2, ..., 4.9 and the second machine element 14 is somewhat smaller during the intended use of the grounding ring than in the exemplary embodiment of FIG. 1a.

Figure 2B:
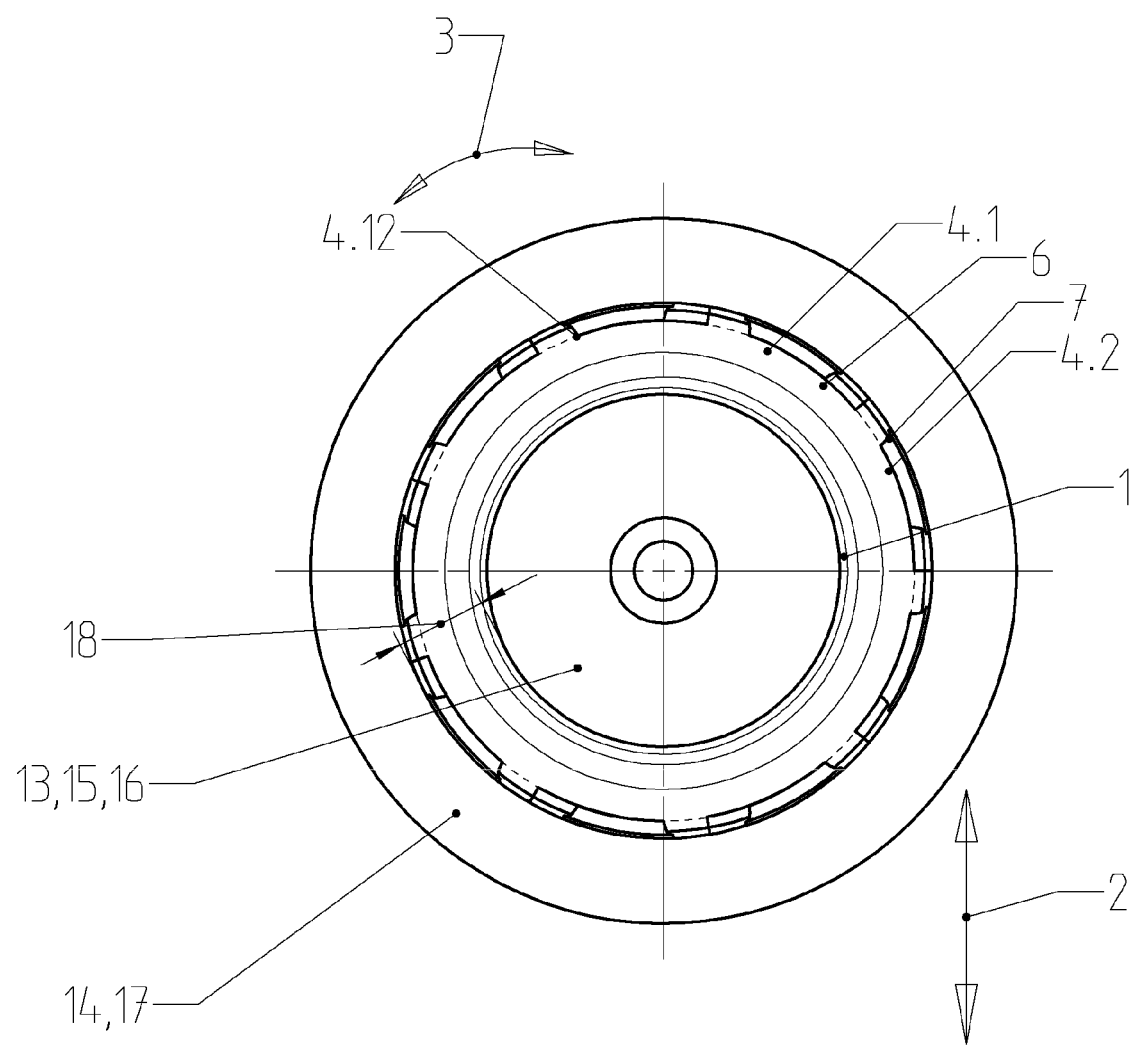

FIG. 2b also shows the grounding ring from FIG. 2a in a view from the right, but during its intended use, installed in an arrangement according to the invention.

Both grounding rings from FIGS. 1a and 2a have the advantage that the sliding contacts 4.1, 4.2, ..., 4.12/4.9 do not overlap one another during the intended use, which would lead to a reduction in the contact area on the inner circumference of the second machine element 14.

FIG. 3 shows an embodiment of the grounding ring, which is of two-part design and bears electrically conductively against the first machine element 13 with a radially inner coverage 20 and against the second machine element 14 with a radially outer coverage 19.

In the embodiment shown here, the radially outer coverage 19 is approximately 5 mm, whereas the radially inner coverage 20 is approximately 1 mm.

The circumferential gaps 8 in the previously shown exemplary embodiments each have a radial extent of 2 mm to 20 mm, depending on the size of the diameter of the two machine elements 13 and 14.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A grounding ring configured for radially outward contact with a machine element, comprising a substantially circular-ring-shaped hub and at least two sliding contacts, wherein:
   the at least two sliding contacts are arranged on an outside of the hub in a radial direction, extend in a circumferential direction, and in a manufactured state of the grounding ring, are arranged adjacent to one another at a distance from one another in the circumferential direction to delimit a circumferential gap,
   each of the sliding contacts comprises sides facing one another in the circumferential direction,
   each of the sliding contacts are configured to bend such that the circumferential gap is substantially bridged by the mutually facing sides, the mutually facing sides do not overlap, and the at least two sliding contacts bear against the machine element outward in the radial direction, and
   the circumferential gap in the manufactured state of the grounding ring is delimited in a substantially V-shaped manner.

2. The grounding ring according to claim 1, wherein the number of sliding contacts is 4 to 50.

3. The grounding ring according to claim 1, wherein the number of sliding contacts is 8 to 12.

4. The grounding ring according to claim 1, wherein the circumferential gap has a radial extent of 2 mm to 20 mm.

5. The grounding ring according to claim 1, wherein each of the sliding contacts have a base on a side facing the hub in the radial direction and a free end on a side opposite the base in the radial direction, the base has a first width in the circumferential direction, the free end has a second width in the circumferential direction and the first width is greater than the second width.

6. The grounding ring according to claim 5, wherein a ratio of the first width to the second width is 1.25 to 1.5.

7. The grounding ring according to claim 1, wherein the hub and the sliding contacts merge integrally into one another and are formed from uniform material and consist of an electrically conductive material.

8. The grounding ring according to claim 7, wherein the electrically conductive material is a metallic material.

9. The grounding ring according to claim 1, wherein the sides of each sliding contact are straight from the first width to the second width such that each sliding contact decreases in width at the same rate along the radial direction from the first width to the second width.

10. An arrangement comprising a grounding ring and a first and a second machine element, each of which consists of an electrically conductive material, wherein;

the grounding ring includes a circular-ring-shaped hub and at least two sliding contacts, the at least two sliding contacts are arranged on an outside of the hub in a radial direction, extend in a circumferential direction, in a manufactured state of the grounding ring, are arranged adjacent to one another at a distance from one another in the circumferential direction and delimit a circumferential gap, each of the sliding contacts comprises sides facing one another in the circumferential direction, the circumferential gap is substantially bridged by the mutually facing and mutually non-overlapping sides, and the first machine element is formed by a shaft or axle and the second machine element is formed by a housing enclosing the shaft or axle at a radial distance, wherein the grounding ring is arranged in the gap formed by the distance.

11. The arrangement according to claim 10, wherein the grounding ring is connected in a relatively rotationally fixed manner to the first machine element and is in bearing contact with an inside of the second machine element in the radial direction in a relatively rotatable manner.

12. The arrangement according claim 10, wherein the sliding contacts are assigned to the second machine element with a radially outer coverage of 1 mm to 6 mm.

13. The arrangement according to claim 10, wherein the sliding contacts are assigned to the first machine element with a radially inner coverage of 0.2 mm to 1.2 mm.

14. The arrangement according to claim 10, wherein the grounding ring is connected to the first machine element in a force-fitting and/or form-fitting manner.

* * * * *